United States Patent [19]
Kirchmann et al.

[11] Patent Number: 6,073,936
[45] Date of Patent: *Jun. 13, 2000

[54] VEHICLE SEAL

[75] Inventors: Gunter Kirchmann, Bockenem; Hans-Volker Buchholz; Alistair Hill, both of Hildesheim, all of Germany

[73] Assignee: Meteor Gummiwerke K.H. Bädje GmbH & Co., Bockenem, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/448,382

[22] PCT Filed: Apr. 19, 1994

[86] PCT No.: PCT/EP94/01201

§ 371 Date: Jun. 7, 1995

§ 102(e) Date: Jun. 7, 1995

[87] PCT Pub. No.: WO94/26545

PCT Pub. Date: Nov. 24, 1994

[30]    Foreign Application Priority Data

May 19, 1993  [DE]  Germany ........................ 93 07 620 U

[51] Int. Cl.[7] ...................................................... F16J 15/12
[52] U.S. Cl. ........................... 277/640; 277/637; 277/651; 277/906; 277/921; 49/475.1; 49/492.1; 49/493.1
[58] Field of Search ..................................... 277/161, 181, 277/182, 185, 186, 189, 637, 640, 642, 651, 906, 922, 925; 49/489.1, 492.1, 475.1, 493.1, 490.1

[56]    References Cited

U.S. PATENT DOCUMENTS

| | | | |
|---|---|---|---|
| 2,546,049 | 3/1951 | Weaver et al. | 49/493.1 |
| 2,601,512 | 6/1952 | Gagnier | 49/492.1 |
| 2,716,787 | 9/1955 | Harris | 49/492.1 |
| 3,059,292 | 10/1962 | General Motors . | |
| 3,110,938 | 11/1963 | Beck et al. | 49/492.1 |
| 3,182,120 | 5/1965 | Duhn | 277/189 |
| 3,309,817 | 3/1967 | Fisher | 49/493.1 |
| 4,165,083 | 8/1979 | Dochnahl | 277/184 |
| 4,614,347 | 9/1986 | Krusehwitz | 277/184 |
| 4,666,206 | 5/1987 | Hough | 49/489.1 |
| 4,864,774 | 9/1989 | Onishi et al. | 49/492.1 |
| 5,433,038 | 7/1995 | Duphy | 49/492.1 |

FOREIGN PATENT DOCUMENTS

| | | | |
|---|---|---|---|
| 241191 | 10/1962 | Australia | 49/492.1 |
| 1037480 | 9/1953 | France . | |
| 2624191 | 6/1989 | France . | |
| 1240751 | 5/1967 | Germany . | |
| 1293616 | 4/1969 | Germany . | |
| 4105032 | 8/1992 | Germany . | |
| 61-273920 | 4/1987 | Japan . | |
| 2137268 | 10/1984 | United Kingdom | 49/475.1 |

*Primary Examiner*—Daniel G. DePumpo
*Attorney, Agent, or Firm*—Synnestvedt & Lechner LLP

[57]    ABSTRACT

A vehicle seal (1) comprises an elastic molded sealing member (19) with holes through which clips (16) on a fastening rail (11) made of plastics material extend into anchoring holes in a vehicle body. The molded sealing member (19) is made in a molding tool (2) by being injected on to and vulcanized to the fastening rail (11) which is laid within the molding tool. The molding tool (2) is divided and includes a molding recess (8) in which the fastening rail (11) is laid. On one mold part (6), for each clip (16), there is provided a cap (9) which sealingly encircles the clip (16) and which extends into the molding recess (8) when the molding tool (2) is closed. Each cap (9), when the molding tool (2) is closed has its free edge (18) pressed into sealing contact with a base (12) of the fastening rail (11) which carries the clips (16). A coupling layer (15) is provided between the fastening rail (11) and the molded seal (19).

21 Claims, 4 Drawing Sheets

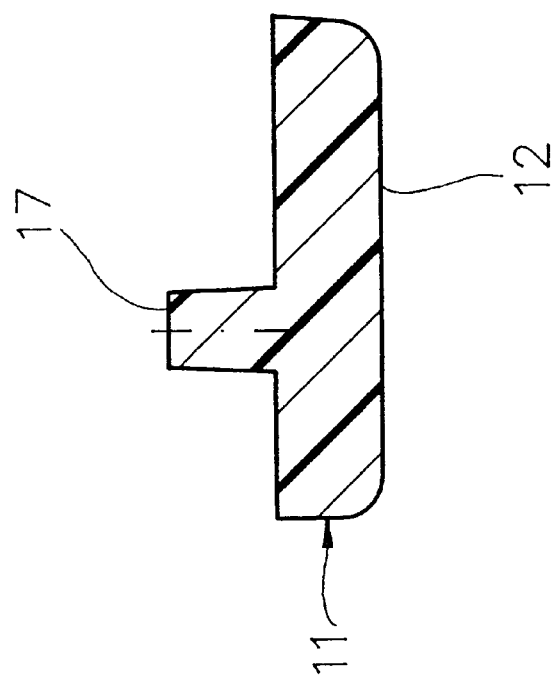
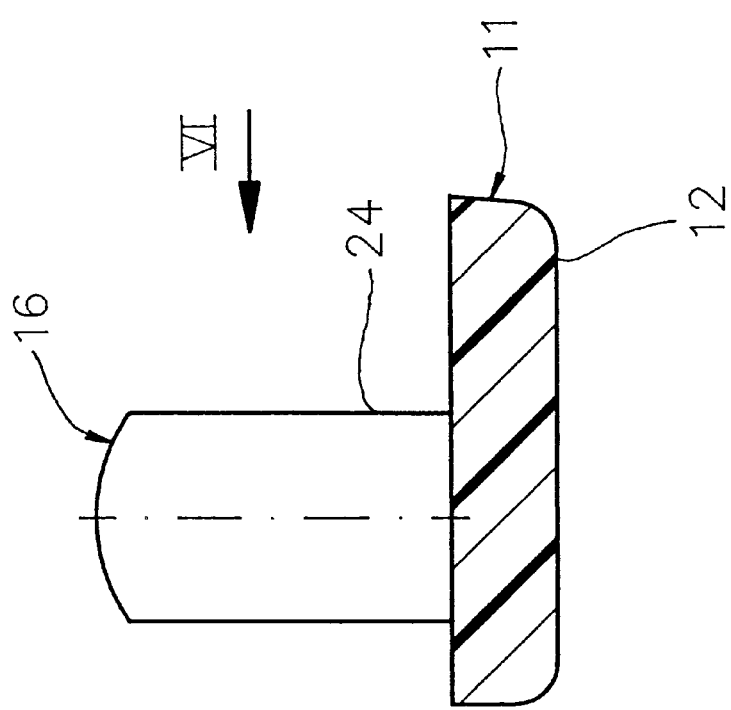

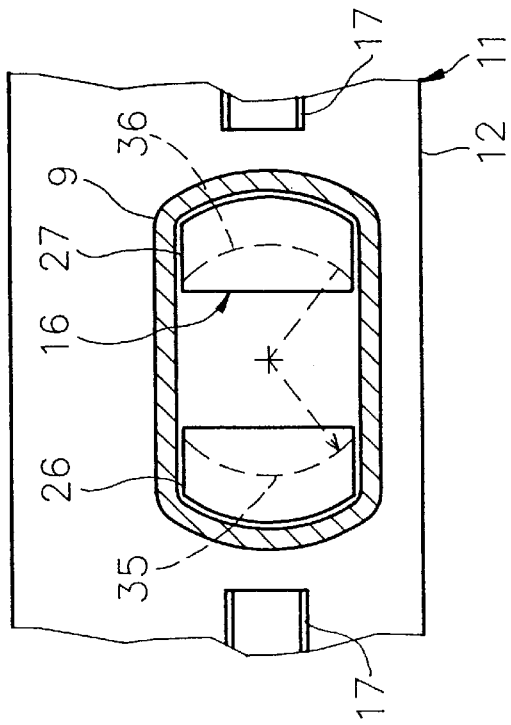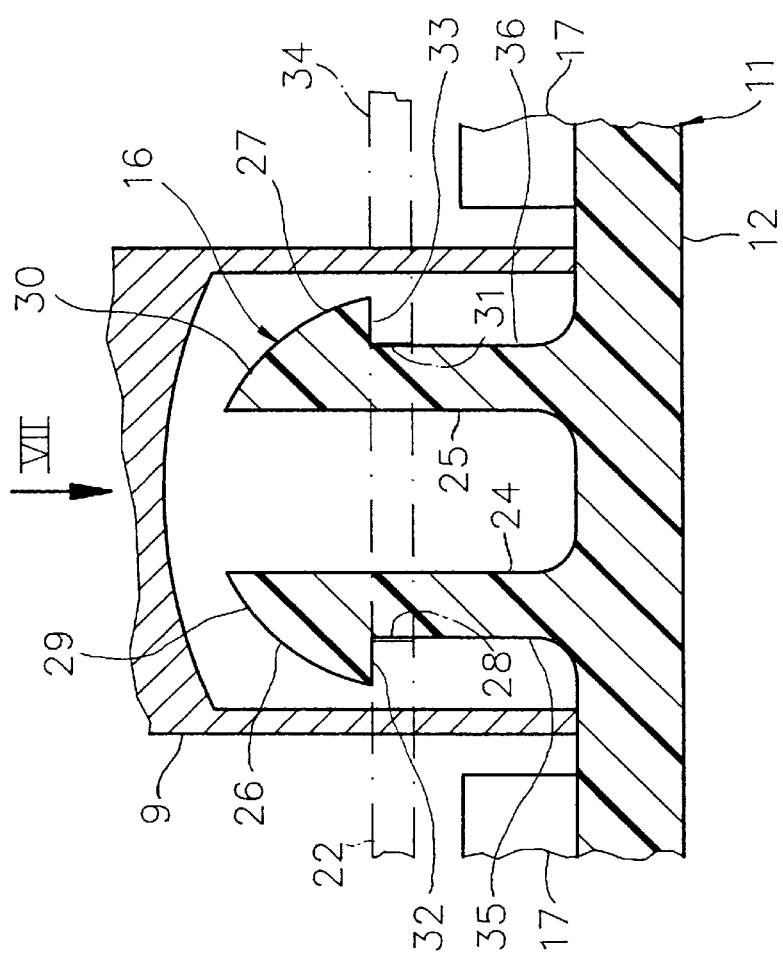

VEHICLE SEAL

BACKGROUND

This invention relates to a vehicle seal comprising an elastic molded sealing member with holes through which clips on a fastening rail made of plastics material extend into anchoring holes in a vehicle body.

It is known to supply the molded seals made generally of rubber and the fastening rails of plastics material made by different manufacturers to the manufacturers of motor vehicles. Molded seals and fastening rails are pre-assembled in the factory by the molded seal with its holes being "buttoned on" to the clips of the fastening rail. Subsequently, this pre-assembled unit has the heads of the clips projecting from the molded sealing pressed into the anchoring holes in the vehicle body and latched in place therein. However, the comparatively high production cost to the vehicle manufacturer of this known procedure is disadvantageous. DE 41 05 032 A1 shows one such fastening rail.

From DE 1 293 616 B it is known to join a sealing lip of sponge rubber on to an extruded, waterproof, hollow rubber profile in a molding tool. Subsequently, the heads of round fastening bolts are pressed into the holes in the free surfaces of the rubber profile. The bolt stems are pushed through receiving bores in the body panel and are anchored there. The profile is totally floppy.

From U.S. Pat. No. 3,059,292A it is known to form circular fastening cones of elastomer spaced from one another on a carrier profile made of an elastomer. Into an axial hollow chamber of each fastening cone is set a pressure pin whose head extends into a sealing profile of foam or sponge rubber fixed to the carrier profile. The finished profile is floppy and is mounted so that each fastening cone is set into a receiving bore in a body panel. Then, with a finger, pressure is exerted on the head of the pin at the fastening point until an undercut of the fastening cone snaps into the receiving bore.

SUMMARY OF THE INVENTION

It is the object of the invention to reduce the assembly cost to the vehicle manufacturer and to improve the vehicle seal.

This is achieved in accordance with the invention in a vehicle seal of the type first referred to above, in which the fastening rail is fixedly connected to the molded sealing member. The fixed connection of the fastening rail to the molded sealing member is done by the supplier of the vehicle manufacturer, so that the manufacturer is then only concerned with the handling and assembly of the finished vehicle seal. By means of the fixed connection of the fastening rail and molded sealing member to one another, their positions relative to one another are optimized.

The fastening section can be fixed to the molded sealing member by means where the molded sealing member is injected onto and vulcanized to the fastening rail. This leads to a positionally accurate and tight connection between the fastening rail and the molded seal along the whole length of the vehicle seal.

By spacing the molded sealing member circumferentially from the clips to provide all-around spacing, the clips are in no way impaired in their function by the molded seal. This is not always guaranteed with prior art seals, since there, in the pre-assembled state of the vehicle seal, the molded seal must be held right over the walls of the anchoring holes.

A molding tool for the manufacture of a vehicle seal of the present invention is also provided. The mold includes a cap which ensures that during the formation of the molded sealing member on the fastening rail no material of the molded sealing member can penetrate into the free space between the clips and the molded sealing member.

Further features and advantages of the invention will become apparent from the following description of embodiments of the invention which are given by way of example and which are shown in the drawings.

BRIEF DESCRIPTION OF THE DRAWINGS

FIG. 4 is the section view taken along the line IV—IV in FIG. 2, on an enlarged scale;

FIG. 5 is the sectional view taken along the line V—V in FIG. 2 on an enlarged scale;

FIG. 6 is the sectional view taken along the line VI—VI in FIG. 3, on an enlarged scale; and FIG. 7 shows the detail VII in FIG. 6.

DETAILED DESCRIPTION

Figure 1:
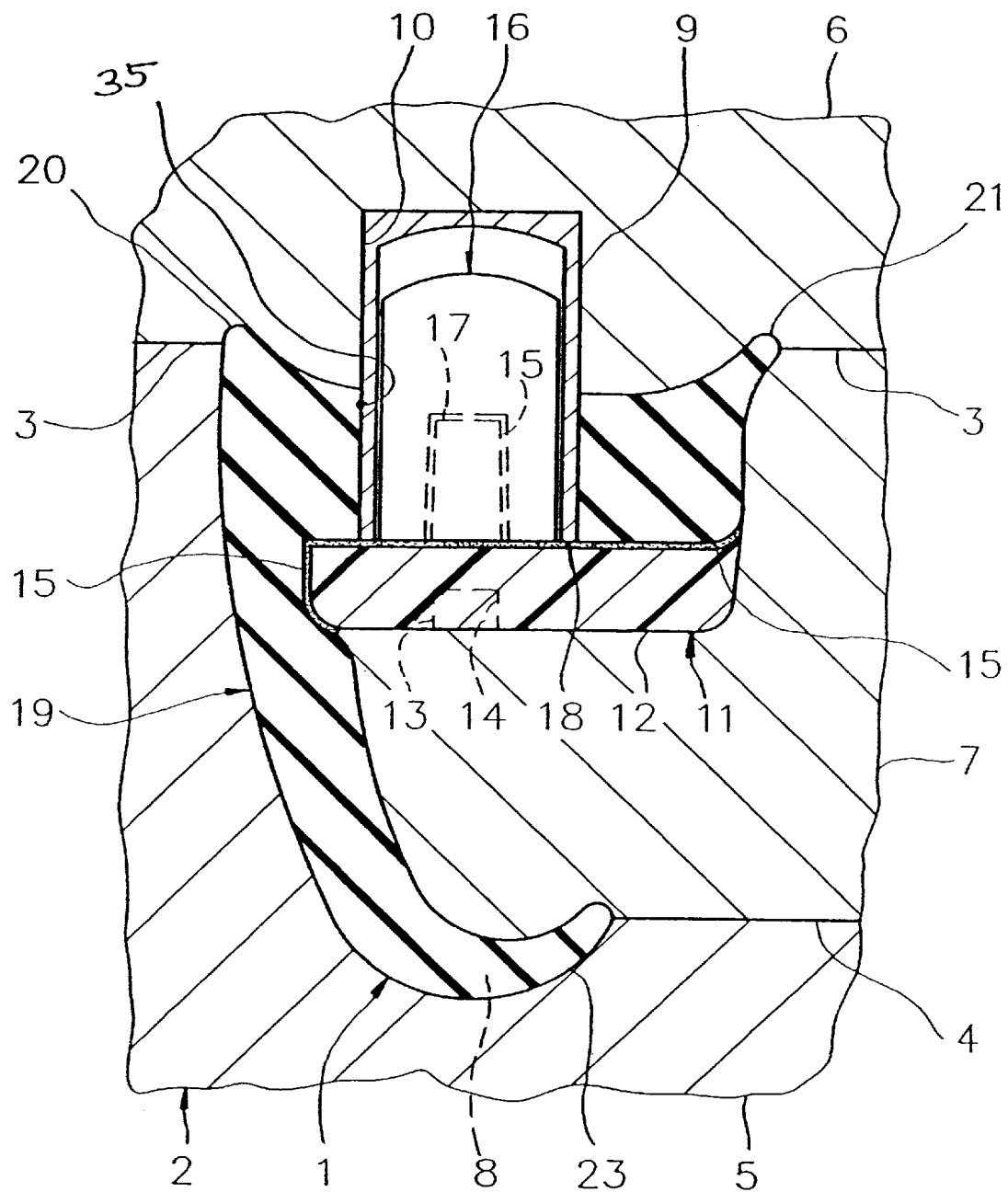
FIG. 1 is a cross-section through a vehicle seal located in a molding tool.

FIG. 1 shows a vehicle seal 1 after its manufacture within a molding tool 2.

The molding tool 2 is divided along parting planes 3 and 4 into a stationary lower part 5 of the mold, an upper part 6 of the mold which can be raised and lowered, and an insert 7 which is positioned between the lower part 5 and upper part 6 of the mold and which likewise can be raised and lowered.

Between the mold parts 5 to 7 there is defined a mold recess 8 which determines the external contour of the vehicle seal 1. A bell shaped cap 9 which is fixed into a receiving hole 10 in the upper part 6 of the mold projects from above in the mold recess 8.

FIG. 1 shows the molding tool 2 in its closed operational state. In order to produce the vehicle seal 1, the upper part 6 of the mold is first raised and the insert 7 is lowered until it comes into contact with the lower part 5 of the mold along the parting plane 4. Then a fastening rail 11 already made from plastics material is laid on the insert 7 by having its base 12 set down from above into the molding recess 8. At least two spaced positioning pins 13 on the insert 7 locate in corresponding positioning holes 14 in the base 12 of the rail and ensure a trouble-free positioning of the fastening rail 11 in the molding recess 8.

At its upper surface the rail base 12 is provided with a coupling layer 15 and with clips 16 which are spaced from one another. A reinforcing rib 17 is provided on the rail base 12 between each pair of adjacent clips 16. Each reinforcing rib 17 is likewise overlaid with the coupling layer 15, which can be kept very thin. The reinforcing rib 17 reinforces the vehicle seal between adjacent clips 16. Nevertheless, the reinforcing ribs do not interfere with the seal function since they are embedded in the molded seal around the full circumference and therefore do not appear at the outside.

Then, the upper part 6 of the mold is lowered. The bell shaped caps 9 engage over the respective associated clips 16 and with their bottom, free edges 18 are pressed sealingly against the coupling layer 15 and consequently against the base 12. The downward movement of the upper part 6 of the mold continues until it is seated on the parting line 3 on the lower part 5 of the mold and the insert 7. This closes the molding tool. An elastic material such as rubber is then injected into the remaining unoccupied part of the mold recess 8, and forms a molded sealing member 19 of the vehicle seal 1. Through the medium of the coupling layer 15 the molded sealing member 19 is fixedly vulcanized to the rail base 12 and the reinforcing ribs 17. As soon as this process has been concluded, the upper part 6 of the mold is raised. As a result of this the lower regions of the caps 9 are withdrawn from the molded sealing member 19. Then, the insert 7 together with the vehicle seal 1 is raised sufficiently far for the vehicle seal 1 to be removable from the molding tool 2.

In referring to this example to the vehicle seal 1, reference is being made to a door seal. The molded sealing member 19 is provided with continuous sealing noses 20 and 21 along its sides which face a pillar of the vehicle body in the later assembly. The sealing noses 20, 21 are deformed upon the fitting of the vehicle seal by the vehicle body panel 22 (FIG. 6) to achieve the desired sealing effect and press against the vehicle body panel under tension in the fitted state in which the clips 16 shown in FIG. 6 engage latchingly behind the body panel 22.

As shown in FIG. 1, the molded sealing member 19 also includes a sealing lip 23 against which, later, with the vehicle seal 1 fitted, a door is in contact accompanied by deformation of the sealing lip 23.

Figure 2:
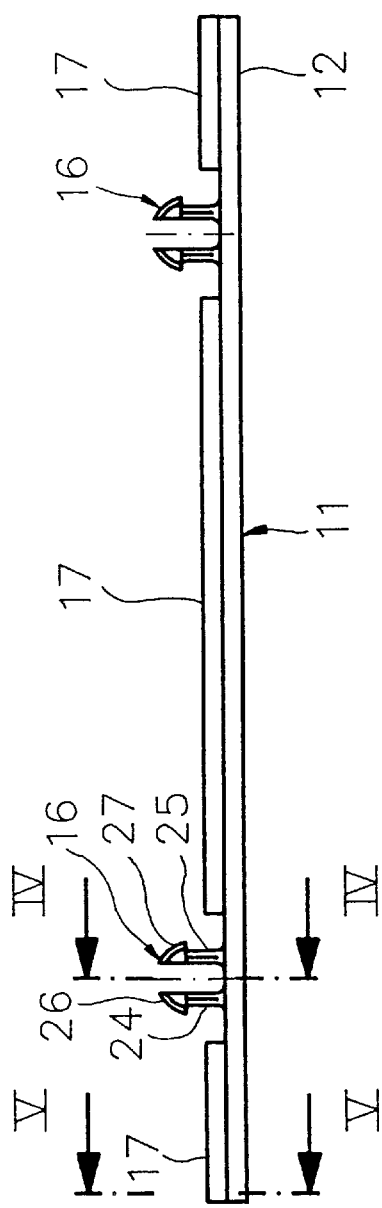
FIG. 2 is a side view, on a reduced scale, of a fastening rail used in FIG. 1.
Figure 3:
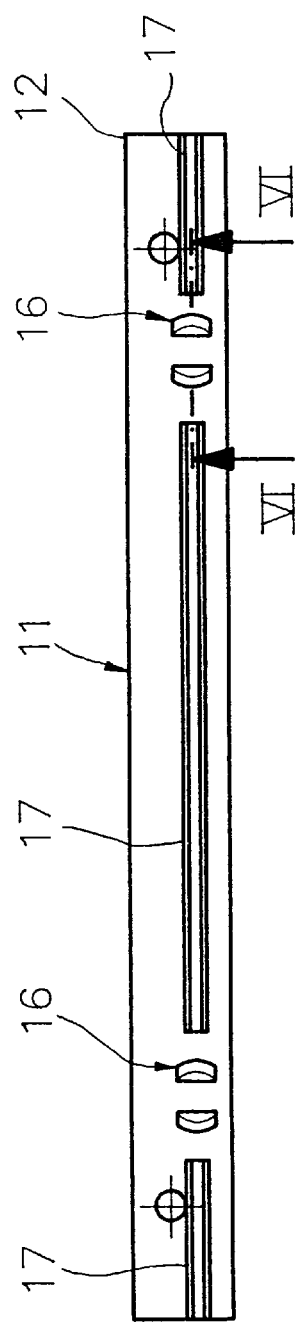
FIG. 3 is the plan view of the fastening rail shown in FIG. 2.

FIGS. 2 and 3 show details of the fastening rail 11, in side view and plan view.

Each clip 16 comprises two legs 24 and 25 which are formed spaced from each other on the rail base 12 and which at their free ends carry respective latching heads 26 and 27. The legs 24, 25 are resilient, so that they can move yieldingly towards one another and away from one another. The clips 16, as illustrated, are preferably positioned to extend through the holes 35 in the molded sealing member 19 with all-around spacing from the molded sealing member 19. The holes 35 in the sealing member 19 are formed by the caps 9 during the molding process and are seen in FIG. 1 as being large enough in diameter so that the clips 16 are spaced circumferentially from the sealing member 19 so that the sealing member 19 does not impair the function of the clips 16.

The reinforcing ribs 17 are provided not only between adjacent clips 16 but also beyond the outermost clips 16 of the fastening rail 11.

FIGS. 4 to 7 show further details, particularly of the fastening rail 11.

As shown in FIG. 6, the body panel 22 has for each clip 16 an anchoring hole 28 which, in this case, is circular. The latching heads 26, 27 are hook shaped. When the clip 16 in FIG. 6 is pushed through from below into the anchoring hole 28, outer inclined faces 29 and 30 of the latching heads 26, 27 slide along an outer edge 31 of the anchoring hole 28. As a result of this the legs 24, 25 are bent increasingly toward one another, until the maximum diameter of the inclined faces 29 and 30 has passed through the anchoring hole 28 and the latching heads 26, 27 snap into place behind an internal face 34 of the body panel 22 by radial latching faces 32 and 33 of the heads engaging this internal face. This snapping into place of the heads takes place because of the elastic restoring forces of the legs 24 and 25.

In FIGS. 6 and 7 the cap 9 of the molding tool 2 is also shown. FIG. 7 indicates that the latching heads 26, 27 are each provided on the outside with circular cylindrical contact face 35 and 36 which in the latched position shown in FIG. 6 make contact with the inside surface of the circular anchoring hole 28.

Suitable materials for the molded sealing member 19 include elastic materials such as the following:

EPDM soft rubber;

EPDM expanded rubber; and thermoplastic elastomers (TPE) including those based upon: styrene ethylene butylene styrene (S-EB-S), styrene butadiene styrene (SBS), styrene isoprene styrene (SIS), those based upon elastomer combinations as TPO blends or TPO alloys such as cross-linked EPDM/propylene blend (EPDM/PP) or ethylene vinyl acetate/vinylidene chloride (EVA/PVDC), and thermoplastic polyurethane (TPU).

Suitable materials for the fastening rail 11 include:

polyamide, preferably glass fiber reinforced polyamide; and polyphenylene ether (PPE).

Polyamides give the fastening rail 19 special rigidity.

Suitable materials for the coupling layer 15 include polypropylene primer.

What is claimed is:

1. A vehicle seal comprising:

an elastic molded sealing member having a top surface and a bottom surface and holes extending therethrough; and a fastening rail having a top surface and a bottom surface, said top surface having a plurality of clips integral with said fastening rail and projecting upwardly therefrom, each clip passing through a corresponding hole in said sealing member and capable of being received in anchoring holes in a vehicle body, and said fastening rail and said clips being formed of a plastic material;

a reinforcing rib on the fastening rail between an adjacent pair of said clips, said rib being embedded in said molded sealing member;

wherein said top surface of said fastening rail is bonded to said bottom surface of said molded sealing member with said fastening rail clips extending through said corresponding holes in said sealing member.

2. A vehicle seal in accordance with claim 1 wherein said holes in said sealing member are formed to provide spacing around the circumference of said clips between said clips and said sealing member to prevent impairment of the function of the clips.

3. A vehicle seal in accordance with claim 1 wherein said fastening rail comprises polyamide.

4. A vehicle seal in accordance with claim 1 wherein said fastening rail comprises polyphenylene ether (PPE).

5. A vehicle seal in accordance with claim 1 wherein said molded sealing member comprises an EPDM soft rubber or an EPDM expanded rubber.

6. A vehicle seal in accordance with claim 1, further comprising a coupling layer between said fastening rail and said molded seal, wherein said coupling layer comprises a polypropylene primer.

7. A vehicle seal in accordance with claim 1 further comprising a coupling layer between said fastening rail and said molded sealing member.

8. A vehicle seal in accordance with claim 1 wherein said molded seal is sealing member is molded to said fastening rail.

9. A vehicle seal in accordance with claim 8 wherein said holes in said sealing member are formed to provide spacing around the circumference of said clips between said clips and said sealing member to prevent impairment of the function of the clips.

10. A vehicle seal in accordance with claim 8 further comprising a reinforcing rib on said fastening rail between an adjacent pair of said clips, said rib being embedded in said molded sealing member.

11. A vehicle seal in accordance with claim 8 wherein said fastening rail comprises polyamide.

12. A vehicle seal in accordance with claim 8 wherein said fastening rail comprises polyphenylene ether (PPE).

13. A vehicle seal in accordance with claim 8 wherein said molded sealing member comprises an EPDM soft rubber or an EPDM expanded rubber.

14. A vehicle seal in accordance with claim 8 wherein the molded sealing member comprises a thermoplastic elastomer (TPE).

15. A vehicle seal in accordance with claim 8 further comprising a coupling layer bonding said fastening rail to said sealing member.

16. A vehicle seal in accordance with claim 15 wherein said coupling layer comprises a polypropylene primer.

17. A vehicle seal in accordance with claim 1 wherein the molded sealing member comprises a thermoplastic elastomer (TPE).

18. A vehicle seal in accordance with claim 17 wherein the molded sealing member comprises a thermoplastic elastomer based upon styrene ethelyne butylene styrene (S-EB-S).

19. A vehicle seal in accordance with claim 17 wherein the molded sealing member comprises a thermoplastic elastomer based upon styrene isoprene styrene (SIS).

20. A vehicle seal in accordance with claim 17 wherein the molded sealing member comprises a thermoplastic elastomer based upon elastomer combinations as TPO blends or TPO alloys.

21. A vehicle seal in accordance with claim 17 wherein the molded sealing member comprises a thermoplastic elastomer based upon thermoplastic polyurethane (TPU).

* * * * *